x`
United States Patent
Seetzen

(10) Patent No.: US 8,035,604 B2
(45) Date of Patent: *Oct. 11, 2011

(54) DRIVING DUAL MODULATION DISPLAY SYSTEMS USING KEY FRAMES

(75) Inventor: Helge Seetzen, Vancouver (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 1106 days.

This patent is subject to a terminal disclaimer.

(21) Appl. No.: 11/831,920

(22) Filed: Jul. 31, 2007

(65) Prior Publication Data
US 2007/0285587 A1 Dec. 13, 2007

Related U.S. Application Data

(63) Continuation of application No. 10/599,954, filed as application No. PCT/CA2004/002197 on Dec. 24, 2004.

(60) Provisional application No. 60/566,925, filed on Apr. 3, 2007.

(51) Int. Cl.
*G09G 3/36* (2006.01)
(52) U.S. Cl. .......................................... 345/102; 349/61
(58) Field of Classification Search .......... 345/690–698, 345/87–104; 349/61
See application file for complete search history.

(56) References Cited

U.S. PATENT DOCUMENTS

| | | | |
|---|---|---|---|
| 4,877,998 A | 10/1989 | Maninger et al. | |
| 5,461,397 A * | 10/1995 | Zhang et al. | 345/102 |
| 5,740,352 A | 4/1998 | Philipp et al. | |
| 6,157,396 A | 12/2000 | Margulis et al. | |
| 6,373,832 B1 | 4/2002 | Huang et al. | |
| 6,817,717 B2 | 11/2004 | Childers et al. | |
| 7,053,881 B2 | 5/2006 | Itoh | |
| 7,420,531 B2 * | 9/2008 | Park et al. | 345/87 |
| 7,450,104 B2 | 11/2008 | Baik | |
| 2002/0130830 A1 | 9/2002 | Park | |
| 2003/0010894 A1 | 1/2003 | Yoshihara et al. | |
| 2004/0246242 A1 | 12/2004 | Sasaki | |

FOREIGN PATENT DOCUMENTS

| | | |
|---|---|---|
| EP | 1202244 A1 | 5/2002 |
| WO | 03/032288 A1 | 4/2003 |

OTHER PUBLICATIONS

International Search Report for PCT/CA2004/002197, International Searching Authority, Mar. 29, 2005.

* cited by examiner

*Primary Examiner* — Amare Mengistu
*Assistant Examiner* — Vinh Lam

(57) ABSTRACT

Methods and systems process image data made up of a series of frames for displaying on a dual modulation display system having a first modulator disposed to illuminate a second modulator. A first modulation signal and a luminance map are not calculated for every frame. Instead, certain frames referred to as "key frames" are used to provide the first modulation signal and the luminance map for at least some other frames.

12 Claims, 5 Drawing Sheets

US 8,035,604 B2

DRIVING DUAL MODULATION DISPLAY SYSTEMS USING KEY FRAMES

REFERENCE TO RELATED APPLICATION

This application is a continuation of application Ser. No. 10/599,954 filed on 24 Dec. 2004 which claims the benefit of the filing date of U.S. patent application No. 60/566,925 filed on 3 May 2004 and entitled "METHOD FOR EFFICIENT COMPUTATION OF IMAGE FRAMES FOR DUAL-MODULATION DISPLAY SYSTEMS USING KEY FRAMES", which is hereby incorporated by reference.

TECHNICAL FIELD

The invention relates to processing image frames to be displayed on dual modulation display systems. Certain embodiments of the invention relate to methods and systems for efficient computation of modulation signals.

BACKGROUND

In order for images to be displayed on a display, the display generally needs to be connected to an interface configured to receive image data and convert it to signals to be used by the display. The interface varies depending on the type of display. For displays which comprise a modulator, the interface typically comprises a modulator driver coupled to a processor.

The processor receives image data and generates a modulation signal for the modulator driver. The modulation signal generally causes the modulator to generate a plurality of pixels in order to reproduce the image. Calculation of the modulation signal can be computationally expensive.

The inventor has invented methods and systems which reduce the computational cost of processing image data to be displayed on a dual modulation display system.

SUMMARY OF INVENTION

Video image data comprises a series of frames which change over time to give the viewer the illusion of movement. The inventor has determined that the difference between frames is more often than not less than the dynamic range of the second modulator of a dual modulation system, and that accordingly it may be possible to display a series of frames without adjusting the first modulator. Some aspects of the invention provide methods wherein a first modulation signal and luminance map from one frame (referred to herein as a "key frame") are used for a plurality of other frames, such that the overall computational cost of processing image data is reduced.

Further aspects of the invention and features of specific embodiments of the invention are described below.

BRIEF DESCRIPTION OF DRAWINGS

In drawings which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
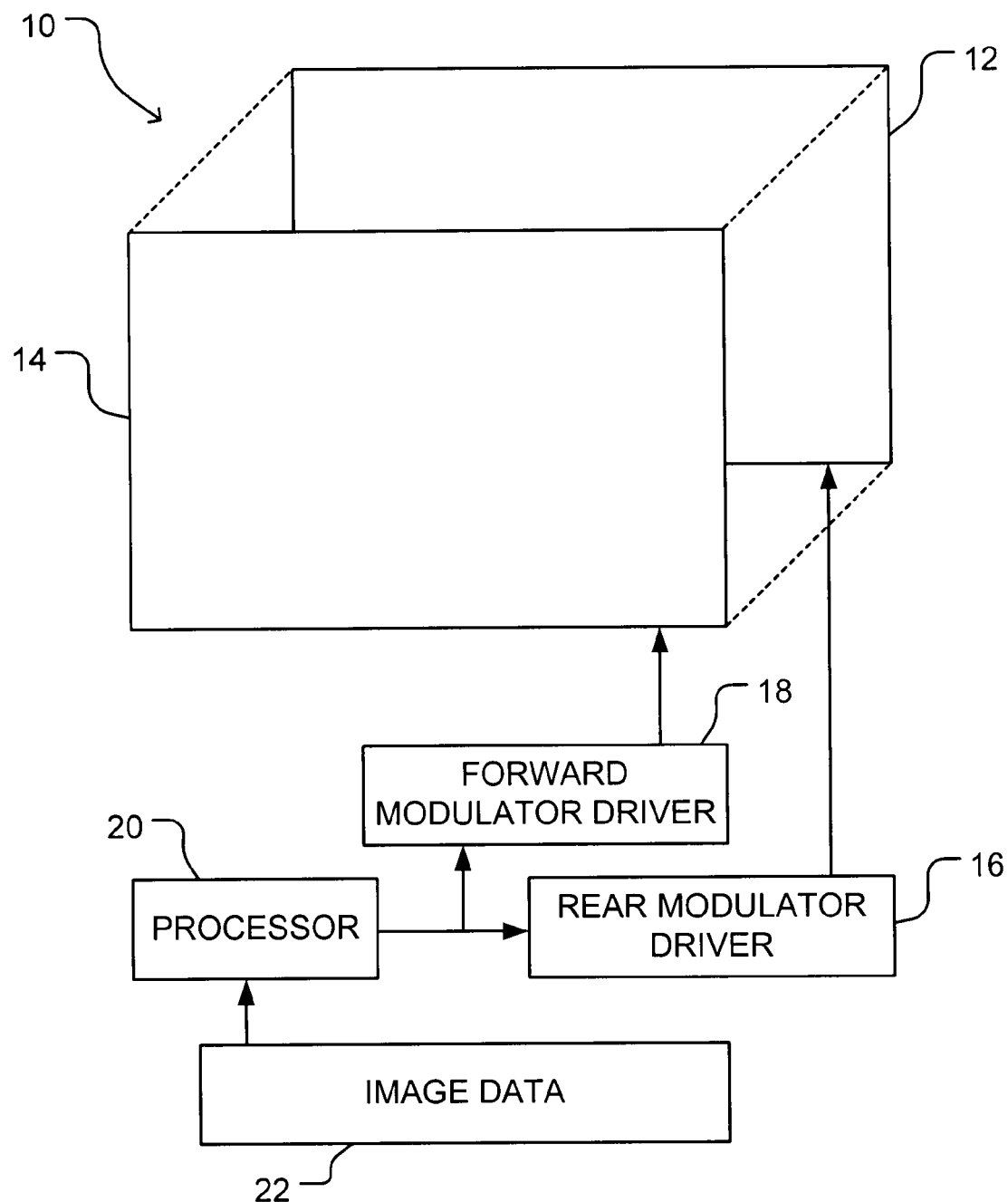
FIG. 1 shows a dual modulation display system.

A dual modulation display system, generally indicated by reference character 10 in FIG. 1, typically has a rear modulator 12 and a forward modulator 14. Rear modulator driver 16 is connected to rear modulator 12, and forward modulator driver 18 is connected to forward modulator 14. A processor 20 is connected to rear modulator driver 16 and forward modulator driver 18. Processor 20 receives image data 22 and provides rear and forward modulation signals to rear and forward modulator drivers 16 and 18, respectively.

Rear modulator 12 may have a relatively low resolution and forward modulator 14 may have a relatively high resolution. Rear modulator 12 may comprise an array of light emitting diodes (LEDs), a video projector or a backlight. Forward modulator 14 generally comprises a liquid crystal display (LCD).

Figure 2:
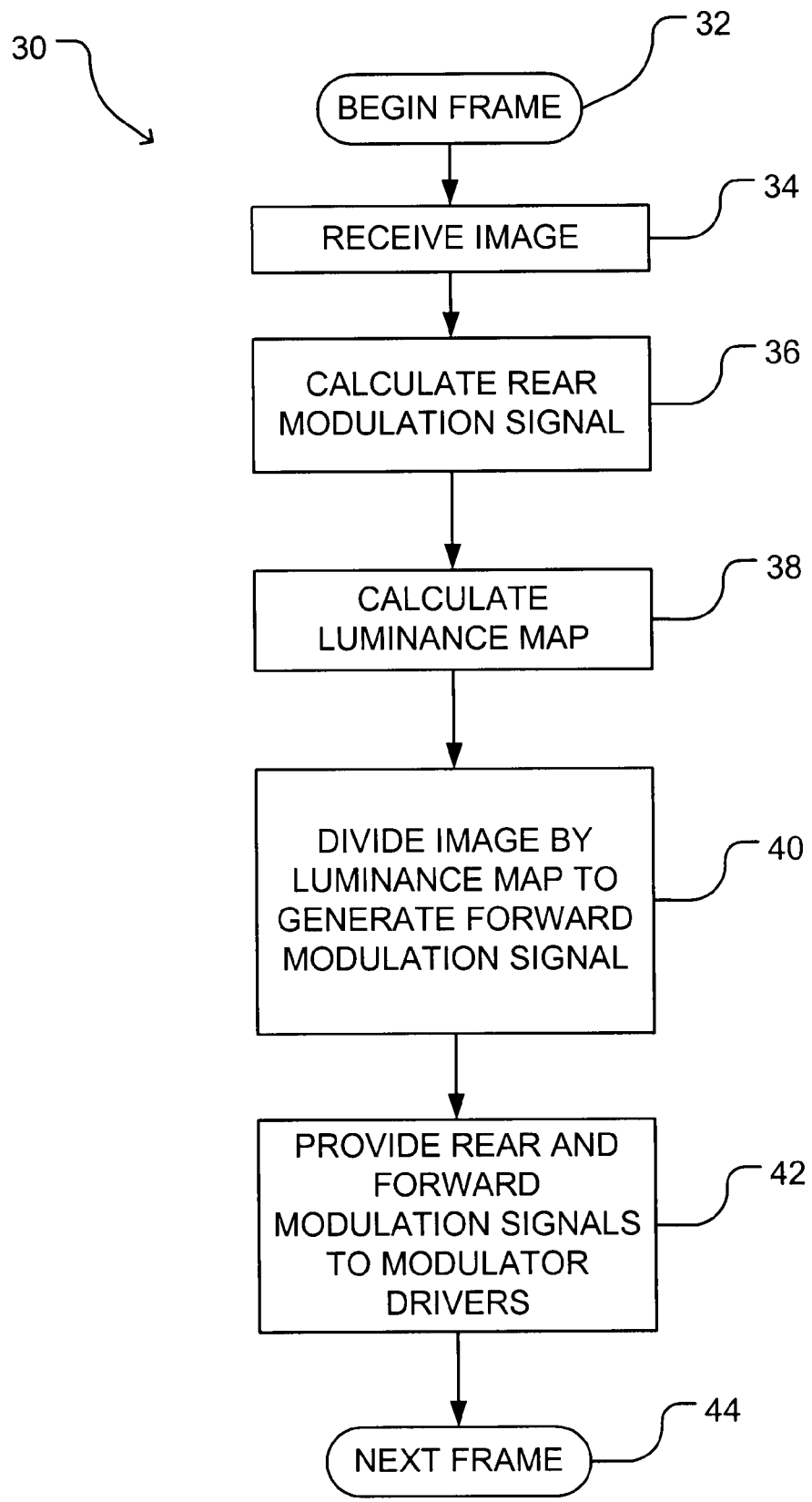
FIG. 2 shows a method of processing image.

FIG. 2 illustrates method 30 carried out by processor 20 of FIG. 1. Method 30 begins at block 32, when processor 20 begins processing a frame of image data 22. Processor 20 receives the frame's image data 22 at block 34. At block 36 processor 20 calculates a rear modulation signal for the frame. At block 38 processor 20 calculates an luminance map of light expected to be generated by rear modulator 12 and to be incident on forward modulator 14 when rear modulator 12 is driven by the rear modulation signal for that frame. At block 40, processor 20 divides that frame's image data 22 by the luminance map to generate a forward modulation signal. At block 42, processor 20 provides the rear and forward modulation signals to rear and forward modulator drivers 16 and 18, respectively. Method 30 terminates at block 44, where processor 20 proceeds to process the next frame of image data 22, beginning again at block 32.

When rear and forward modulation signals for a frame are provided to rear and forward modulator drivers 16 and 18, respectively, rear modulator 12 projects light in accordance with the rear modulation signal onto forward modulator 14 to produce the luminance map. Forward modulator 14 optically modulates the light from rear modulator 12 in accordance with the forward modulation signal to display the image for that frame to a viewer in front of forward modulator 14.

In cases where rear modulator 12 comprises a LED array and forward modulator 14 comprises a LCD, processor 20 determines appropriate intensities for each LED of rear modulator 12 for each frame of image data 22 to generate the rear modulation signal for that frame. Processor 20 must then calculate the luminance map of light from rear modulator 12 incident on forward modulator 14 so that processor 20 can generate the forward modulation signal for that frame by dividing the image data 22 by the luminance map. Calculation of the luminance map involves summing the light contributed by each LED to each point on the LCD. The amount of light from a LED reaching a point on the LCD depends on a point spread function for the LED and the power level of the LED. Since these can both be known in principle, one can determine the intensity of light from that LED on each pixel of the LCD.

As one skilled in the art will appreciate, calculation of the luminance map at block 38 of FIG. 2 is computationally expensive. For example, if forward modulator 14 has a resolution of X by Y, and rear modulator 12 comprises an array of 700 LEDs, the luminance map for each of XY pixels must be calculated based on the point spread functions of all of the 700 LEDs which contribute to illumination of that pixel.

The invention provides methods and systems for processing image data made up of a series of frames for displaying on a dual modulation display system having first and second modulators. A system according to the invention provides a modulation signal to each of the modulators. The system drives the second modulator with a second modulation signal that takes into account a luminance map of light from the first modulator incident on the second modulator. The first modulation signal and the luminance map are not calculated for every frame. Instead, the first modulation signal and the luminance map are determined only for selected frames referred to as "key frames". The same first modulation signal and corresponding luminance map (collectively referred to as the "key frame parameters") are used to provide the second modulation signal and the luminance map for a one or more other frames.

The following description makes reference to the example of FIG. 1, where the first modulator comprises rear modulator 16 and the second modulator comprises forward modulator 18. However, it is to be understood that systems according to the invention may be used in association with any type of dual modulation display system wherein the first modulator illuminates the second modulator.

Figure 3:
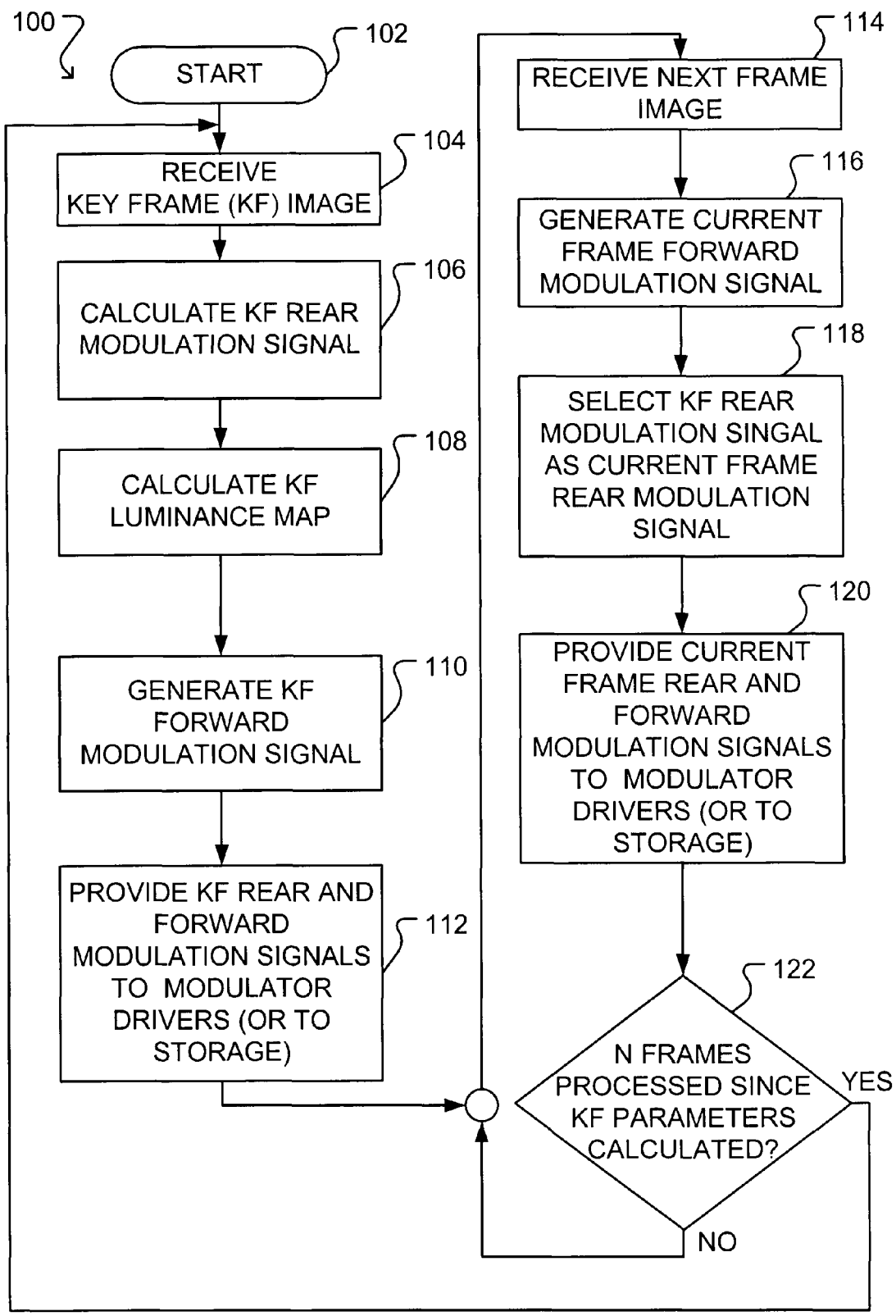
FIG. 3 shows a method of processing image data according to one embodiment of the invention.

FIG. 3 illustrates a method 100 according to one embodiment of the invention. Method 100 may be carried out by a processor of a dual modulation display, such as processor 20 of FIG. 1. Alternatively, method 100 may be carried out on a processor coupled to an image acquisition device such as a video camera, or an independent processor. Method 100 may be used to process image data in any suitable format, including MPEG, AVI, ASF, WMV, RM, MOV, etc. Method 100 may be used to calculate rear and forward modulation signals for a series of frames. The modulation signals may be provided directly to rear and forward modulator drivers 16 and 18 in real of buffered time, or to electronic storage for future use by rear and forward modulator drivers 16 and 18.

Method 100 begins at block 102, where the processor begins processing a series of frames of image data. At block 104 the processor receives a frame of image data, which is designated as a key frame image. At block 106 the processor calculates a key frame rear modulation signal. At block 108 the processor calculates a key frame luminance map. At block 110 the processor divides the key frame image by the key frame luminance map to generate a key frame forward modulation signal. At block 112 the processor provides the key frame rear and forward driving functions to rear and forward modulator drivers 16 and 18, or to electronic storage.

At block 114 the processor receives the next frame image of the series of frames. This next frame image is designated as the current frame image. At block 116 the processor divides the current frame image by the key frame luminance map to generate a current frame forward modulation signal. At block 118 the processor selects the key frame rear modulation signal to be the current frame rear modulation signal. At block 120 the processor provides the current frame rear and forward driving functions to rear and forward modulator drivers 16 and 18, or to electronic storage.

At block 122 the processor determines if N frames have been processed since the key frame rear modulation signal and luminance map were calculated. If not (block 122 NO output), method 100 returns to block 114 where the processor receives the next frame image, and processes that image as the current frame as described above. Once N frames have been processed (block 122 YES output), method 100 returns to block 104 where the processor receives a new key frame image and processes it as described above. In situations where some buffering is possible, the processor may begin the calculations of blocks 106 and 108 for one or more future key frames in the background while the current frames of the previous key frame are still being processed.

The number of frames N to be processed using a single key frame in method 100 may be selected based on expected luminance changes in the series of frames and/or on the dynamic range of forward modulator 14. For example, N may be selected to be 2, such that every third frame in the series of frames is designated as a key frame. In such an example, method 100 would incur approximately one third of the computation cost associated with processing a series of frames as compared to method 30 of FIG. 2.

The rear and forward modulation signals produced by method 100 result in accurate images displayed on dual modulation display system 10 for all of the frames in the series of frames, except for current frames where the luminance differences between the key frame and the associated current frame cannot be accommodated by forward modulator 14. For example, a current frame cannot be accommodated in cases where forward modulator 14 is driven at or near either the upper or lower end of its dynamic range for certain pixels of the key frame image, and the current frame image differs from the key frame image for those pixels such that forward modulator 14 would need to be driven at a level outside of its dynamic range in order to accurately represent those pixels of the current frame image.

In some embodiments, forward modulator 14 comprises an LCD with a dynamic range of 200:1 or greater, such that it can accommodate a wide range of luminance changes between frames. With such a dynamic range and suitable selection of the parameter N, luminance changes between a key frame and its associated current frames which cannot be accommodated by the LCD are rare and unlikely to be visible at the rate at which the frames are displayed in typical video applications.

Figure 4:
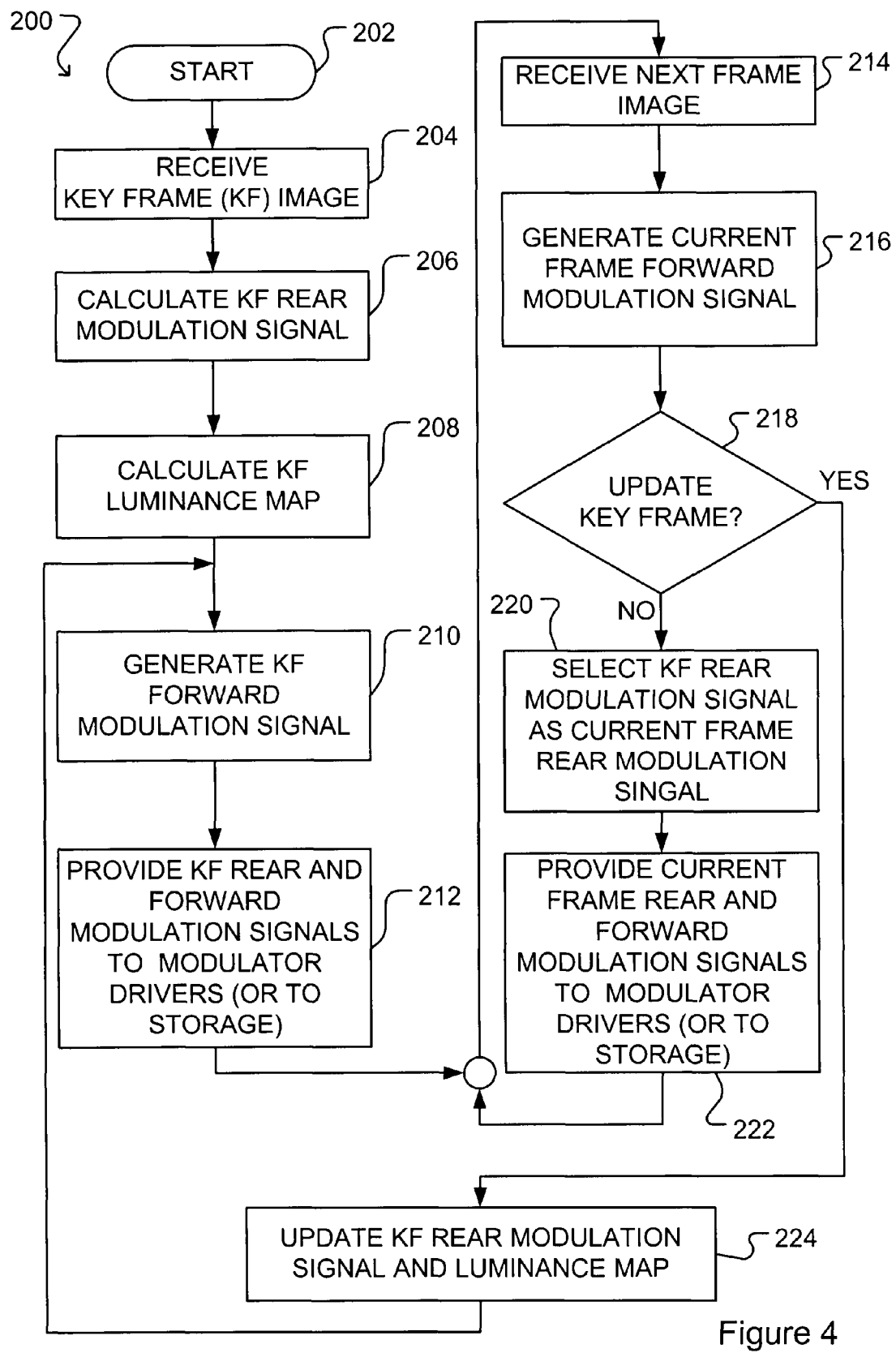
FIG. 4 shows a method of processing image data according to another embodiment of the invention; and,
FIG. 5 shows a method of processing image data according to another embodiment of the invention.

FIG. 4 illustrates a method 200 according to another embodiment of the invention. Method 200 may be carried out in a substantially similar fashion as method 100 of FIG. 3. The steps of blocks 202 to 216 of method 200 are substantially the same as those of blocks 102 to 116 of method 100. Method 200 differs from method 100 in that after the current frame forward modulation signal is generated at block 216, the processor determines whether the key frame luminance map is suitable for reproducing the current frame image at block 218.

The processor may determine whether the key frame should by updated at block 218 based on a comparison of the current frame forward modulation signal generated at block 216 and a range of suitable values for forward modulator driver 16. Such a comparison may be done on a pixel by pixel basis, with the processor keeping track of the number pixels for which the current frame forward modulation signal is outside the range of suitable values for forward modulator driver 16 (referred to herein as "problem pixels"). The processor may also keep track of the locations of the problem pixels. The processor may determine that the key frame should be updated once the number of problem pixels exceeds a predetermined threshold. Alternatively, the processor may determine that the key frame should be updated if the average value by which problem pixels are outside the range of suitable values exceeds a predetermined threshold, a cumulative value by which problem pixels are outside the range of suitable values exceeds a predetermined threshold, or an individual problem pixel is outside the range of suitable values by more than a predetermined threshold.

If the processor determines that the key frame does not need to be updated (block 218 NO output), method 200 proceeds to block 220. At block 220 the processor selects the key frame rear modulation signal to be the current frame rear modulation signal. At block 222 the processor provides the current frame rear and forward driving functions to rear and forward modulator drivers 16 and 18, or to electronic storage. Method 200 then returns to block 214 where the processor receives the next frame image, and processes that image as the current frame as described above.

If the processor determines that the key frame does need to be updated (block 218 YES output), method 200 proceeds to block 224. At block 224 the processor updates the key frame rear modulation signal and the key frame luminance map, using the current frame image as the new key frame image. Method 200 then proceeds to block 210 where the processor generates the key frame forward modulation signal, and block 212 where the driving functions are provided to modulator drivers 16 and 18 or to storage, as described above.

Depending on the computation capabilities of the processor and the speed at which the series of frames need to be processed, at block 224 the processor may take certain shortcuts in updating the key frame parameters in order to avoid undesirable lag time in the processing of the series of frames. For example, instead of calculating an entirely new key frame rear modulation signal using the current frame image as the key frame image, the processor may update only the portions of the key frame rear modulation signal and key frame luminance map calculated in blocks 206 and 208, respectively, which correspond to the problem pixels.

Alternatively, at block 224 the processor may update the key frame rear modulation signal and key frame luminance map calculated in blocks 206 and 208, respectively, on a section by section basis. For example, the processor could update the key frame parameters corresponding to one quarter of the display area on a first pass through block 224. The method then proceeds to block 210 and continues as discussed above, with the processor updating the key frame parameters corresponding to the other three quarters on subsequent passes through block 224 until all of the key frame parameters have been updated. If the partial updates of the key frame parameters cause processor to determine at block 218 that the key frame does not need to be updated (block 218 NO output), method 200 may proceed to block 220 without updating all of the key frame parameters.

Another way in which the processor may reduce the computation time required at block 224 is to reduce the accuracy requirements for calculation of the updated key frame luminance map. For example, in cases where rear modulator 12 comprises an LED array, the processor may use an approximate Gaussian or other suitable function for each LED's light distribution, rather than the actual point spread function for each LED. Such an approximation reduces the computational cost of updating the key frame parameters, and any imperfections introduced thereby are unlikely to be visible to a viewer watching display 10. Furthermore, the approximation may be used only for an interim period while the processor calculates the new key frame luminance map using the actual point spread functions in the background. The approximation may be improved in successive frames using the actual calculations until the new key frame luminance map has been completely calculated.

Figure 5:
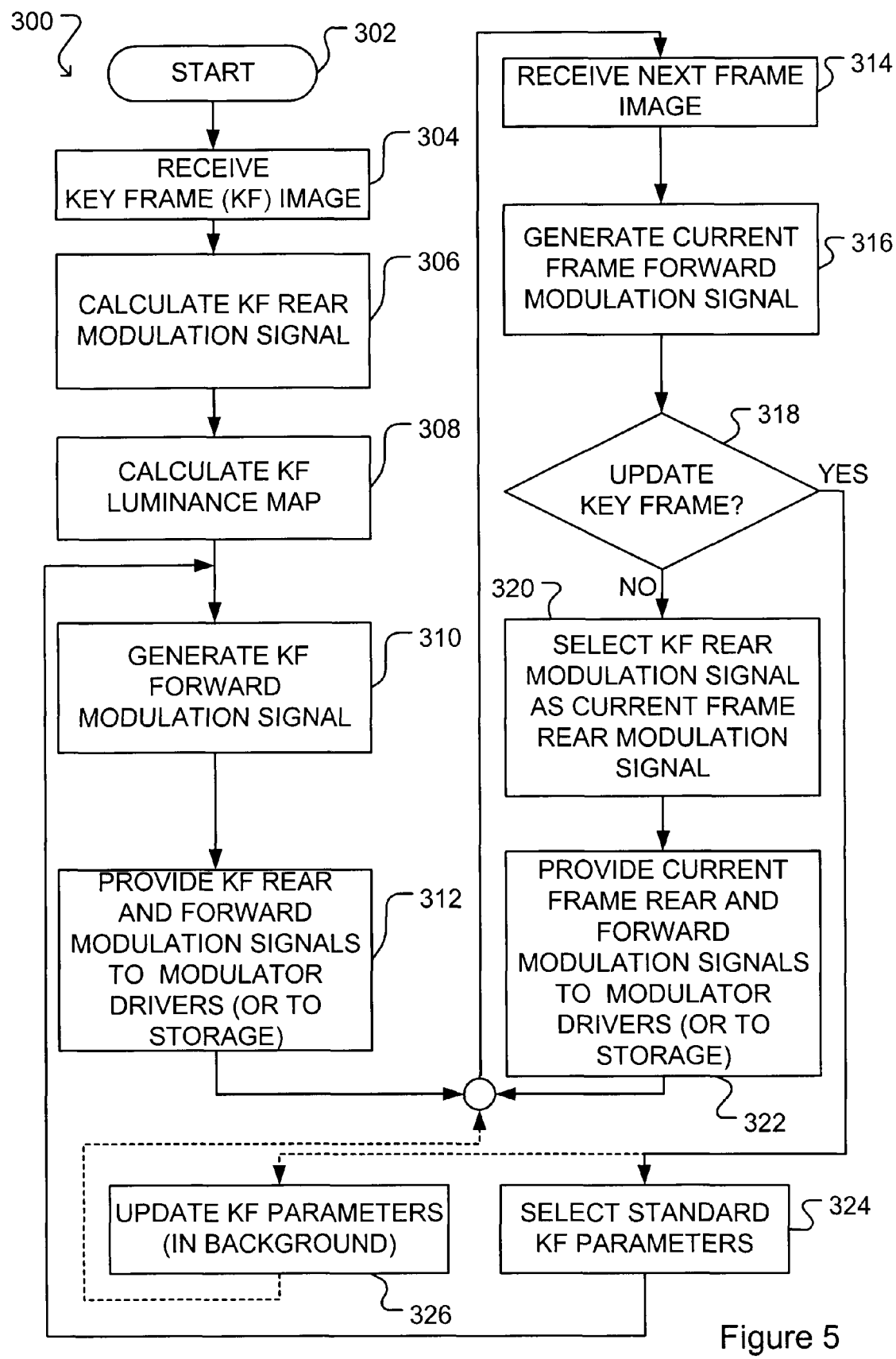

FIG. 5 illustrates a method 300 according to another embodiment of the invention. Method 300 may be carried out in a substantially similar fashion as methods 100 and 200 of FIGS. 3 and 4 respectively. The steps of blocks 302 to 322 of method 300 are substantially the same as those of blocks 202 to 222 of method 200. Method 300 differs from method 200 in that when the processor determines that the key frame does need to be updated (block 318 YES output), method 300 proceeds to block 324 where the processor selects a standard key frame and uses the parameters from the standard key frame to generate the key frame forward modulation signal in block 310. Processor may also update the key frame parameters using the current frame image as the key frame image in the background at block 326 while the standard key frame parameters are being used to process interim frames, as indicated by the dotted lines in FIG. 5.

The standard key frame selected at block 324 may comprise a key frame for which the key frame parameters are already calculated. Examples of standard key frames include frames where rear modulator 12 is driven:

at a constant percentage (e.g. one half) of the full intensity across the whole display area;
at full intensity across the whole display area;
at a constant percentage (e.g. one half) of the full intensity across a selected portion of the display area; and,
at full intensity across a selected portion of the display area.

Alternatively, the processor may store previously processed key frames, and any key frame for which the key frame parameters have already been calculated may be selected as the standard key frame at block 324.

Certain elements of methods 100, 200 and 300 described above may be combined with each other to produce other methods according to various embodiments of the invention. For example, in method 100 the processor may determine if the key frame should be updated between blocks 116 and 118, as in block 218 of method 200.

Consider for example a method wherein every eighth frame is designated as a key frame (N=7), and the processor determines if the key frame should be updated after each current frame forward modulation signal is generated. In any such method wherein certain frames are designated as key frames, the processor may "work ahead" by buffering a number of frames and processing one or more future key frames in the background while the active key frame parameters are being used to process the current frames for the active key frame. To update the key frame, the processor may take the shortcuts discussed above with respect to block 224 of FIG. 4, or may select standard key frame parameters as discussed above with respect to block 324 of FIG. 5.

Additionally or alternatively, when the processor determines that the key frame needs to be updated for one of the 7 current frames being processed, the processor can determine if one of the future key frames would be suitable for processing the current frame. The processor may determine if a future key frame is suitable by dividing the current frame image by the future key frame luminance map. As one skilled in the art will appreciate, the division is a linear process of one operation per pixel and is relatively fast when compared to calculating a plurality of point spread functions for each pixel. Accordingly, a saving in computational cost may be achieved even if a plurality of future and past key frames are checked to determine their suitability for processing the current frame. In practice, it is generally only desirable to check a few key frames ahead of and/or behind the current frame, as such key frames are the most likely to be suitable matches to the image data of the current frame.

Certain implementations of the invention comprise computer processors which execute software instructions which cause the processors to perform a method of the invention. For example, one or more processors in a dual modulation display system may implement data processing steps in the methods described herein by executing software instructions retrieved from a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like or transmission-type media such as digital or analog communication links. The instructions may be present on the program product in encrypted and/or compressed formats.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example, the processor could be integrated with the first and second modulator drivers. Also, in embodiments of the invention for RGB implementations, the luminance map may comprise a color intensity map. Accordingly, the scope of the invention is to be construed in accordance with the substance defined by the following claims.

What is claimed is:

1. Apparatus for driving a display to display a sequence of video frames, the display comprising a first modulator disposed to illuminate a second modulator, the apparatus comprising:
    a processor configured to:
       for each of the video frames output a first modulator driving signal for controlling the first modulator to emit light and output a second modulator driving signal for controlling the second modulator to modulate light emitted by the first modulator to display an image defined by image data for the video frame;
       wherein the processor is configured to:
       in response to key frame image data for a key video frame of the video frames, generate and output a first modulator driving signal for the key frame;
       generate a key frame luminance map based on the first modulator driving signal for the key frame;
       generate and output a second modulator driving signal for the key frame based at least on the key frame luminance map and the key frame image data;
       for one or more additional frames subsequent to the key frame, output the first modulator driving signal for the key frame and generate and output a second modulator driving signal based at least on the key frame luminance map and image data for the one or more additional frames.

2. Apparatus according to claim 1 wherein, for the key frame and for each of the N frames following the key frame, the processor is configured to output the first modulator driving signal for the key frame.

3. Apparatus according to claim 2 wherein the processor is configured to designate every $N+1^{th}$ frame of the sequence of video frames as a key frame.

4. Apparatus according to claim 1 wherein, for each frame, the processor is configured to output the first modulator driving signal for the key frame and the processor is configured to designate a new key frame upon determining that the second modulator driving signal for a frame fails to satisfy an acceptability criterion.

5. Apparatus according to claim 4 wherein determining that the second modulator driving signal for a frame fails to satisfy the acceptability criterion comprises determining that a number of the second modulator driving signal specifies more than a threshold number of pixel values that are outside of a range of suitable values.

6. A display comprising:
    a first modulator comprising a plurality of elements having individually-controllable light outputs and arranged in a two-dimensional array;
    a second modulator disposed to modulate light emitted by the first modulator to display an image;
    a processor configured to:
       for each of the video frames output a first modulator driving signal for controlling the first modulator to emit light and output a second modulator driving signal for controlling the second modulator to modulate light emitted by the first modulator to display an image defined by image data for the video frame;
       wherein the processor is configured to:
       in response to key frame image data for a key video frame of the video frames, generate and output a first modulator driving signal for the key frame;
       generate a key frame luminance map based on the first modulator driving signal for the key frame;
       generate and output a second modulator driving signal for the key frame based at least on the key frame luminance map and the key frame image data; and,
       for one or more additional frames subsequent to the key frame, output the first modulator driving signal for the key frame and generate and output a second modulator driving signal based at least on the key frame luminance map and image data for the one or more additional frames;
    a first driving circuit connected to drive the second modulator in response to the second modulator driving signal; and,
    a second driving circuit connected to the first modulator in response to the second modulator driving signal.

7. A display according to claim 6 wherein the light emitters comprise light-emitting diodes.

8. A display according to claim 6 wherein the first modulator comprises a projector.

9. A display according to claim 6 wherein the second modulator comprises a liquid crystal display (LCD) panel.

10. A method for processing a series of frames of a video sequence for display on a display comprising a first modulator disposed to illuminate a second modulator, the method comprising:
    processing a frame to provide corresponding first and second modulator driving signals,
    designating at least one frame subsequent in the video sequence to the frame as a key frame and for the key frame generating a first modulator driving signal and a luminance map based on the first modulator driving signal, and, if the luminance map for the key frame matches the frame, setting the first modulator driving signal for the frame to be the same as the first modulator driving signal for the key frame and generating a second modulator driving signal for the frame based on the luminance map for the key frame.

11. A method according to claim 10 comprising simultaneously processing a plurality of frames wherein the frame is one of the plurality of frames and the method comprises determining whether the luminance map for the key frame matches one or more of the plurality of frames.

12. A method according to claim 10 wherein comprises dividing a frame image for the one of the frames by the luminance map for the key frame.

* * * * *